LEMUEL W. HARRIS, OF CHICAGO, ILLINOIS, ASSIGNOR TO HIMSELF AND HERMAN McGONEGAL, OF SAME PLACE.

*Letters Patent No. 85,657, dated January 5, 1869.*

IMPROVED STOMACH-BITTERS.

The Schedule referred to in these Letters Patent and making part of the same.

*To all whom it may concern:*

Be it known that I, LEMUEL W. HARRIS, of the city of Chicago, in the county of Cook, and State of Illinois, have invented certain new and useful Improvements in "Stomach-Bitters;" and I do hereby declare that the following is a full, clear, and exact description thereof.

The object of my bitters is to cleanse the stomach, purify the blood, and keep the system in order.

The bitters consist of the following herbs and roots:

One-half ounce of Peruvian bark; one-half ounce of black-cherry bark; one-half ounce of wahoo (*Euonymus*) bark; one-half ounce of prickly-ash bark; one-half ounce of English chamomile-flowers; one-half ounce of aloes; one ounce of powdered rhubarb-root; two drachms of orange-peel; one drachm of coriander-seed; one-half ounce of sweet flag, (*Calamus aromaticus;*) one ounce of burdock-root, (*Arctium;*) one ounce of sassafras-bark The above ingredients are ground in a mill and macerated in one quart of good corn-whiskey for ten days. Then the whiskey is pressed out of the ingredients, and the liquid is percolated.

What I claim as my invention, and desire to secure by Letters Patent, is—

The stomach-bitters, consisting of the ingredients herein specified, and prepared in the manner substantially as set forth.

LEMUEL W. HARRIS.

Witnesses:
   J. B. TURCHIN,
   H. P. GRYDEN.